No. 840,271. PATENTED JAN. 1, 1907.
E. C. F. VERSCHAVE.
MANUFACTURE OF FRAMES AND TUBES.
APPLICATION FILED SEPT. 29, 1904.
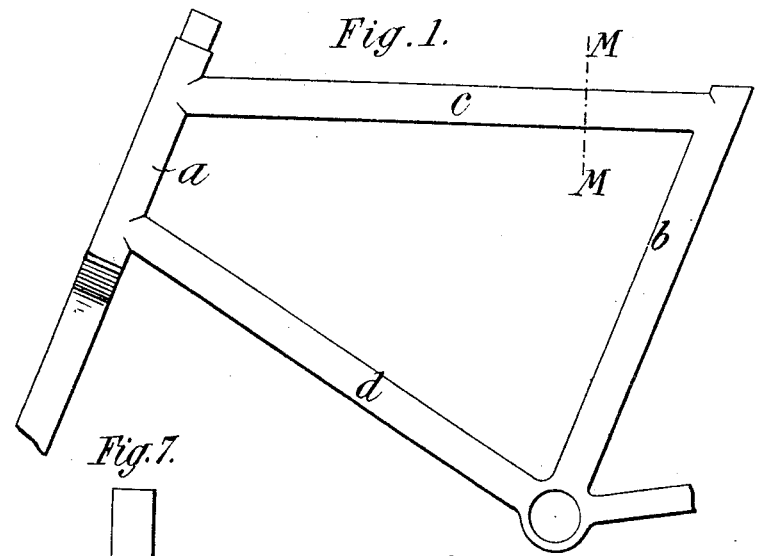
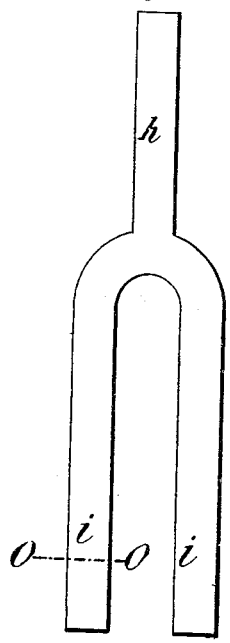
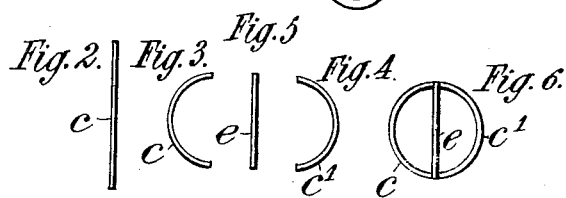
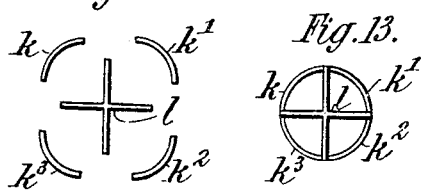
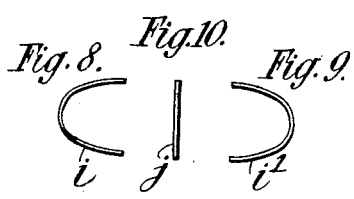
WITNESSES:
Fred White
René Muine
INVENTOR:
Edouard Charles François Verschave,
By his Attorney
Arthur E. Fraser

UNITED STATES PATENT OFFICE.

EDOUARD CHARLES FRANÇOIS VERSCHAVE, OF PARIS, FRANCE.

MANUFACTURE OF FRAMES AND TUBES.

No. 840,271.  Specification of Letters Patent.  Patented Jan. 1, 1907.

Application filed September 29, 1904. Serial No. 226,579.

*To all whom it may concern:*

Be it known that I, EDOUARD CHARLES FRANÇOIS VERSCHAVE, a citizen of the Republic of France, residing in Paris, France, have invented certain new and useful Improvements in the Manufacture of Frames and Tubes, of which the following is a specification.

This invention has for its object the manufacture of fittings, frames, and tubes for cycles, motor-vehicle frames, and the like, which tubes are formed with an inner partition or core arranged along a diameter and serving to strengthen the tube or fitting so as to impart great resistance to it in the direction of the strains which this fitting or tube will have to support. Each tube or part of the fitting is formed by the pressing or drawing of two semicircular parts which are assembled at their edges, between which is pinched a metallic band, the height of which corresponds with the external diameter of the tube, the three parts of which the tube is thus composed being united by welding.

The drawings represent, by way of example, the manner in which the invention may be applied to the manufacture of a bicycle-frame.

Figure 1 is a blank for forming the principal members of a bicycle-frame. Figs. 2, 3, 4, and 5 are sections of separate parts of a tube. Fig. 6 is a section of a complete tube. Fig. 7 is a blank for forming a fork. Figs. 8, 9, and 10 are sections of separate parts, and Fig. 11 a section of another tube. Figs. 12 and 13 are sections of a third tube before and after assembling, respectively.

In order to form a bicycle or similar frame composed of members extending angularly to each other and for producing in one and the same operation all the large tubes of this frame, there is cut (see Fig. 1) in the sheet metal a blank presenting the form of an ordinary frame with the steering-post tube $a$, the seat-pillar tube $b$, the top tube $c$, and the bottom tube $d$. As shown to a larger scale in section through M M, Fig. 2, each portion of the frame thus stamped out is plane, and each of these parts is pressed so as to form almost a complete semicircle, as shown in Fig. 3, the length being, however, less than that of the complete semicircle by an amount corresponding to the thickness of the strip or core. Having stamped and formed in a similar manner a symmetrical counterpart $c'$, Fig. 4, and a strip $e$, Fig. 5, the width of which is equal to the external diameter of the semicircular part $c$ or $c'$, the two parts are brought together, nipping between their edges the extremities of the said band $e$, these three parts being then welded along the meeting lines or generatrixes. In this manner there is obtained, as shown in Fig. 6, a tube of absolutely circular cross-section, presenting along a diameter and directed in a vertical plane a reinforcing partition or core which largely assists in strengthening the tube against flexion. The front or steering fork is also formed from two cheeks of metal presenting the profile represented in Fig. 7. The upper part $h$ is first pressed into semicircular form, and the two arms of the fork $i\ i$ are pressed into a semi-ellipsoidal form, as shown, to a larger scale, the section on O O, Fig. 8. A similar part is formed semicircular at its upper part $h$ and semi-ellipsoidal in the fork $i'$, Fig. 9. A sheet $j$, Fig. 10, presenting the profile shown in Fig. 7, but of which the different widths are reduced to the external diameter of $h$ at the upper part and to the small diameter of the ellipses $i\ i'$ in the fork proper, is interposed between the edges of the two cheeks referred to. As before, the three parts $i$, $i'$, and $j$ are united by welding along their line of junction, Fig. 11.

In cases in which it is desired to obtain still greater strength, and this in two directions at right angles, vertically and horizontally, the tube is formed from four pieces of sheet metal $k\ k'\ k^2\ k^3$, bent into the form of quadrants of circles, as shown in Fig. 12, their length being diminished by the thickness of the core, and between the edges of these four bent tube members are interposed the edges of a cross-shaped iron member $l$, Figs. 12 and 13. As in the foregoing case, these parts are assembled by welding by means of a blowpipe or electricity or in any other appropriate manner. This kind of tube is intended more especially for the framework of motor-vehicles; but it is also adapted for many other uses.

As will be readily understood, the tubes may equally well be formed of any desired number of pressed tube members presenting the form of portions of a circle. Between the edges of these tube members are interposed the extremities of a core of appropriate form in one or more pieces.

Finally, in order to finish the tubes thus manufactured the edges of the plate seized between the edges of the assembled tubular sections, if any portion projects from the periphery of the tube, are removed by grinding.

When tubes provided with an inner core in the form of a partition or cross are intended for the circulation of water or other fluids, the internal separations are bored with holes.

In order to obtain an extremely smooth outer surface, the tubes may be finished by a final drawing or by turning in lathe.

Having now particularly described and ascertained the nature of my said invention, and in what manner the same is to be performed, I declare that what I claim is—

The process of making a tubular frame with members extending angularly to each other, which consists in forming sections of sheet metal having the general contour of the finished frame, stamping said sections in approximately semicircular form in cross-section, locating between said sections a reinforce with its faces between the edges of said sections and its edges forming with the outer faces of the semicircular sections a continuous smooth periphery, and welding the whole, whereby the edges form substantially an integral structure having the appearance of a frame formed of ordinary tubes.

In witness whereof I have hereunto signed my name, this 20th day of September, 1904, in the presence of two subscribing witnesses.

EDOUARD CHARLES FRANÇOIS VERSCHAVE.

Witnesses:
GABRIEL BELLIARD,
JOHN BAKER.